(12) United States Patent
Calvo Alonso

(10) Patent No.: US 8,907,231 B2
(45) Date of Patent: Dec. 9, 2014

(54) DISPLAY ARRANGEMENT

(75) Inventor: Vicente Calvo Alonso, Piispanristi (FI)

(73) Assignee: Nokia Corporation, Espoo (FI)

(*) Notice: Subject to any disclaimer, the term of this patent is extended or adjusted under 35 U.S.C. 154(b) by 14 days.

(21) Appl. No.: 13/551,737

(22) Filed: Jul. 18, 2012

(65) Prior Publication Data

US 2014/0022747 A1 Jan. 23, 2014

(51) Int. Cl.
*H05K 7/14* (2006.01)

(52) U.S. Cl.
USPC ......... 174/535; 361/679.3; 345/173; 348/835

(58) Field of Classification Search
USPC ............. 174/389, 535; 313/479; 361/679.3; 345/173; 348/835
See application file for complete search history.

(56) References Cited

U.S. PATENT DOCUMENTS

| | | | |
|---|---|---|---|
| 4,381,421 A * | 4/1983 | Coats et al. | 174/371 |
| 4,514,585 A * | 4/1985 | Paynton | 174/389 |
| 5,171,617 A | 12/1992 | Affolderbach et al. | |
| 5,986,737 A * | 11/1999 | Evanicky et al. | 349/137 |
| 6,720,955 B2 | 4/2004 | Sugawara et al. | |
| 2003/0178931 A1 * | 9/2003 | Asano | 313/477 R |
| 2005/0200264 A1 * | 9/2005 | Kawanami et al. | 313/479 |
| 2006/0284542 A1 * | 12/2006 | Kawasaki et al. | 313/477 R |
| 2007/0229475 A1 | 10/2007 | Gettemy et al. | 345/173 |
| 2009/0283300 A1 | 11/2009 | Grunthaner | |
| 2011/0007005 A1 | 1/2011 | Lee et al. | |
| 2011/0122085 A1 | 5/2011 | Chang | 345/174 |

FOREIGN PATENT DOCUMENTS

| | | |
|---|---|---|
| EP | 1795994 A1 | 6/2007 |
| EP | 1858042 A1 | 11/2007 |
| EP | 2177968 A1 | 4/2010 |
| WO | WO-02/43379 A1 | 5/2002 |
| WO | WO-2011/124784 A1 | 10/2011 |

OTHER PUBLICATIONS

Choi, A., "Cypress Releases Single-Layer Independent Multitouch Sensor for Low-Cost Smartphones", published Feb. 28, 2012, www.azosensors.com, 2 pgs.

Arghire, I., "HTC Edge to Sport 720p Display with Optical Lamination", Nov. 8, 2011, http://news.softpedia.com, 2 pgs.

* cited by examiner

*Primary Examiner* — Hung Ngo
(74) *Attorney, Agent, or Firm* — Harrington & Smith

(57) ABSTRACT

An apparatus and a method are disclosed. The apparatus includes: a display panel having a length, a width and a depth; and a film including a first portion, extending along a surface of the display panel defined by the length and the width, and a second portion, extending at least partially along the depth, coupled to an electronic device housing.

19 Claims, 9 Drawing Sheets

DISPLAY ARRANGEMENT

TECHNOLOGICAL FIELD

Embodiments of the present invention relate to a display arrangement. In particular, they relate to a display arrangement in an electronic device.

BACKGROUND

Many electronic devices comprise a display arrangement comprising an organic light emitting diode (OLED) display panel or a liquid crystal display (LCD) panel. A compact display arrangement that requires only a minimal border around its perimeter advantageously enables the display panel to encompass more of the front face of an electronic device.

BRIEF SUMMARY

According to various, but not necessarily all, embodiments of the invention there is provided an apparatus, comprising: a display panel having a length, a width and a depth; and a film comprising a first portion, extending along a surface of the display panel defined by the length and the width, and a second portion, extending at least partially along the depth, coupled to an electronic device housing.

According to various, but not necessarily all, embodiments of the invention there is provided a method, comprising: causing a first portion of a film to extend along a surface of a display panel, the surface being defined by a length and a width of the display panel; and coupling a second portion of the film, extending at least partially along a depth of the display panel, to an electronic device housing.

According to various, but not necessarily all, embodiments of the invention there is provided an apparatus, comprising: a display panel comprising an array of pixels that, when the display panel is operational, are visible through a surface of the display panel; and a film that extends along the surface, wherein tension in the film at least partially holds the display panel in position in an electronic device housing.

BRIEF DESCRIPTION

For a better understanding of various examples of embodiments of the present invention reference will now be made by way of example only to the accompanying drawings in which.

DETAILED DESCRIPTION

Figure 1:
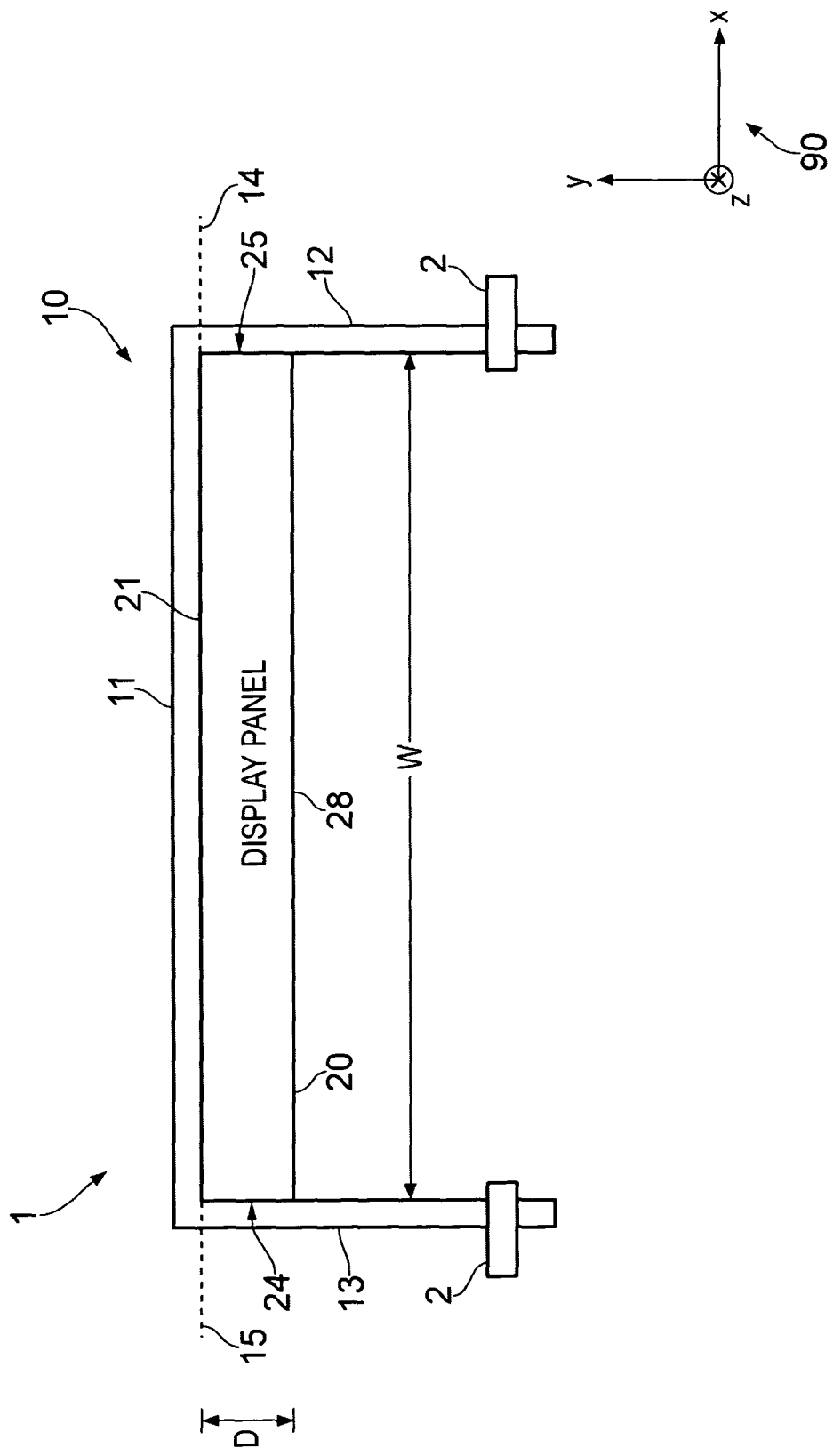
FIG. 1 illustrates a first schematic of a cross section of an apparatus comprising a film and a display panel.

Embodiments of the invention relate to a display arrangement that enables an electronic device with a minimal border around the perimeter of the display panel to be produced.

In this regard, the Figures illustrate an apparatus 1 comprising: a display panel 20 having a length L, a width W and a depth D; and a film 10 comprising a first portion 11, extending along a surface 21 of the display panel 20 defined by the length L and the width W, and a second portion 12, extending at least partially along the depth D, coupled to an electronic device housing 80.

Figure 2:
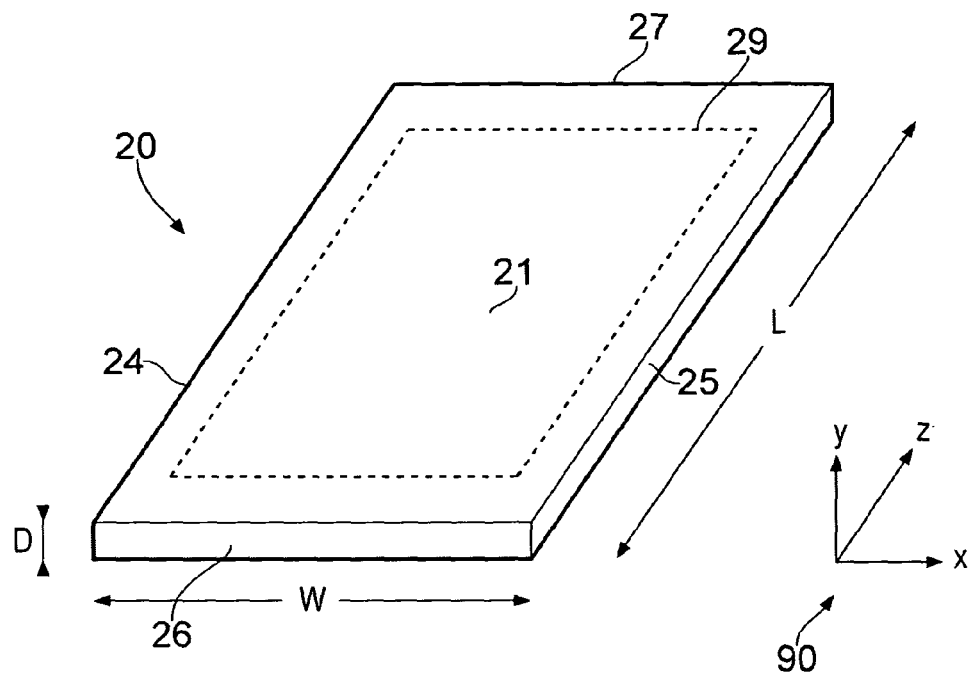
FIG. 2 illustrates a perspective view of the display panel.
Figure 3:
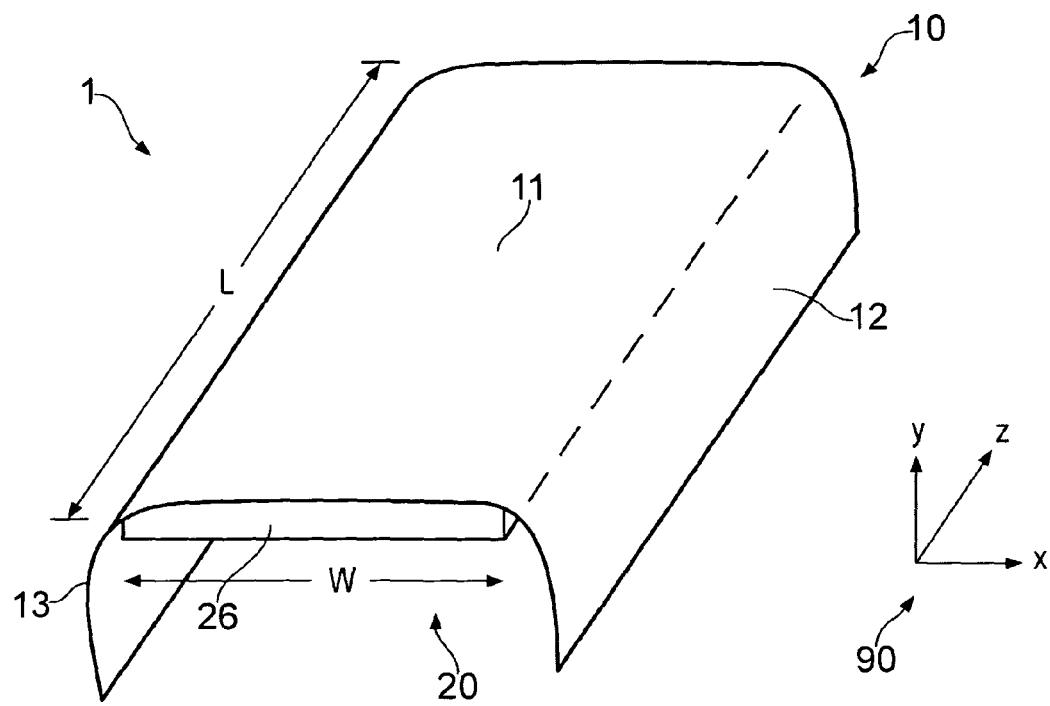
FIG. 3 illustrates a perspective view of the film covering the display panel.

FIG. 1 illustrates a schematic of a cross section of an apparatus/display arrangement 1. The apparatus 1 comprises a film 10 and a display panel 20. The film 10 covers the display panel 20. A perspective view of the display panel 20 is illustrated in FIG. 2. A perspective view of the apparatus 1 is illustrated in FIG. 3. Co-ordinate axes 90 are illustrated in the figures to show the relative orientation of the items in the figures. In FIG. 1, the x and y axes are parallel to the plane of the page and the z-axis is directed into the plane of the page.

The display panel 20 may be any type of display panel, such as an OLED display panel, an LCD panel or a quantum dot display panel. The display panel 20 is cuboidal in shape and has a length L, a width W and a depth D. In the example illustrated in FIGS. 1, 2 and 3, the length L of the display panel 20 is greater than the width W, but in other examples it may be substantially the same. Each of the length L and the width W is greater than the depth D.

The display panel 20 has an upper surface 21 defined by the length L and the width W of the display panel 20 and a lower surface 28 defined by the length L and the width W. The display panel 20 comprises an array of pixels within the area designated by the dotted line 29. When the display panel 20 is operational, the pixels are visible to a viewer through the upper surface 21 of the display panel 20.

The display panel 20 also comprises four side surfaces 24-27. Two opposing side surfaces 24, 25 are defined by the length L and the depth D of the display panel 20. Two further opposing side surfaces 26, 27 are defined by the width W and the depth D of the display panel 20.

The film 10 is a lamina/sheet that has a length and width that is much greater than its depth. The film 10 may, for example, be made from polycarbonate or polyethylene terephthalate (PET). In some implementations, the film 10 may be a substrate for a touch sensitive layer (made from indium tin oxide, for example).

The film 10 covers the upper surface 21 of the display panel 20 and is used to hold the display panel 20 in position in an electronic device housing 80 (not shown in FIGS. 1 to 3). In order to hold the display panel 20 in place, a first portion 11 of the film 10 is positioned such that it extends along the upper surface 21 of the display panel 20. The size and positioning of the first portion 11 is such that it covers all of the pixels of the display panel 20 (for example, so that an edge of the film 10 is not visible to a viewer when the display panel 20 is operational).

A second portion 12 of the film 10 extends from the first portion 11, at least partially along the depth D of the display panel 20. The second portion 12 may extend along the whole of the depth D of the display panel 20. In this particular example, the second portion 12 of the film 10 extends along the side 25 of the display panel 20, such that it is substantially perpendicular to the first portion 11 of the film 10 and substantially parallel with the side 25 of the display panel 20. The second portion 12 of the film 10 may be in contact with the side 25 of the display panel 20. A dotted line 14 in FIG. 1 illustrates where the first portion 11 of the film 10 meets the second portion 12.

A third portion 13 of the film 10 extends from the first portion 11, at least partially along the depth D of the display panel 20. The third portion 13 may extend along the whole of the depth D of the display panel 20. In this particular example, the third portion 12 of the film 10 extends along the side 24 of the display panel 20, such that it is substantially perpendicular to the first portion 11 of the film 10 and substantially parallel with the side 24 of the display panel 20. The third portion 13 of the film 10 may be in contact with the side 24 of the display panel 20. A dotted line 15 illustrates where the first portion 11 of the film 10 meets the third portion 13.

Although the film 10 has been separated into first, second and third portions 11, 12, 13 for the purposes of clearly explaining embodiments of the invention, in this example the three portions 11, 12, 13 of the film 10 are integrally formed (rather than being joined, for instance, at the dotted lines 14, 15). The film 10 may, for example, be substantially homogenous across its complete length, width and depth.

At least the first portion 11 of the film 10 is (substantially) optically transparent. In some embodiments, the whole of the film (including the first, second and third portions 11-13) is optically transparent.

The first portion 11 of the film 10 may be attached directly to the upper surface 11 of the display panel 20. That is, the first portion 11 of the film 10 may be attached to the upper surface 21 of the display panel 20 with no intervening elements between them. The first portion 11 might, for instance, be adhered to the upper surface 21 using an adhesive.

Alternatively, the first portion 11 of the film 10 may be indirectly attached to the upper surface 21 of the display panel 20, such that there is one or more intervening elements between them, such as one or more polarizers. The first portion 11 might, for instance, be adhered to a polarizer that is adhered to the upper surface 21.

Once the film 10 has been bent around the display panel 20 as described above, the second and third portions 12, 13 of the film 10 are coupled to an electronic device housing in order to hold the display panel 20 in place. In the illustrated example, a plurality of fasteners 2 is used to couple the film 10 to the electronic device housing. In some embodiments of the invention, each of the second and third portions 12, 13 of the film 10 are coupled to the electronic device housing by fastening them to a component of an electronic device, such as the engine (for instance, comprising the chassis, printed wiring board and/or one or more chipsets), which is in turn fastened to the electronic device housing. It can be seen from FIG. 1 that the position at which the second and third portions 12, 13 of the film 10 are fastened is spaced from the display panel 20 in the y dimension.

The second and third portions 12, 13 of the film 10 are fastened such that there is tension in the film 10. The tension in the film 10 acts to hold the display panel 20 in place in the electronic device housing. The tension in the first portion 11 of the film 10 acts to oppose movement of the display panel 20 in the +y direction and the tension in the second and third portion 12, 13 acts to oppose movement of the display panel 20 in the +x and −x directions.

Figure 4:
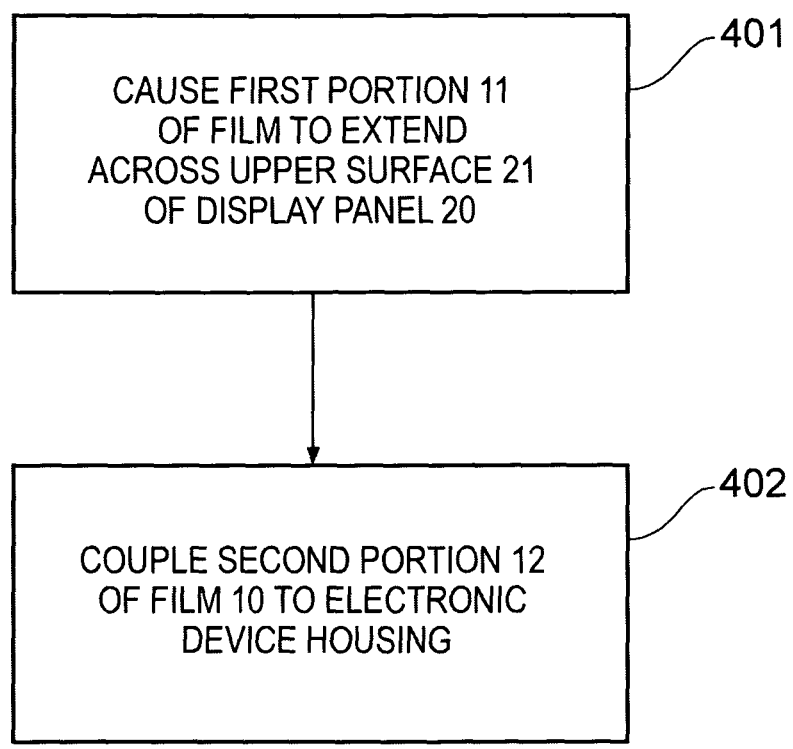
FIG. 4 illustrates a flow chart of a method.

FIG. 4 illustrates a flow chart of a method of manufacture according to embodiments of the invention. Block 401 of FIG. 4 involves causing the first portion 11 of the film 10 to extend along the surface 21 of the display panel 20. Block 402 of FIG. 4 involves coupling the second portion 12 of the film 10, extending at least partially along the depth D of the display panel 20, to an electronic device housing. As mentioned above, the third portion 13 of the film 10 may also be coupled to the electronic device housing.

Figure 5:
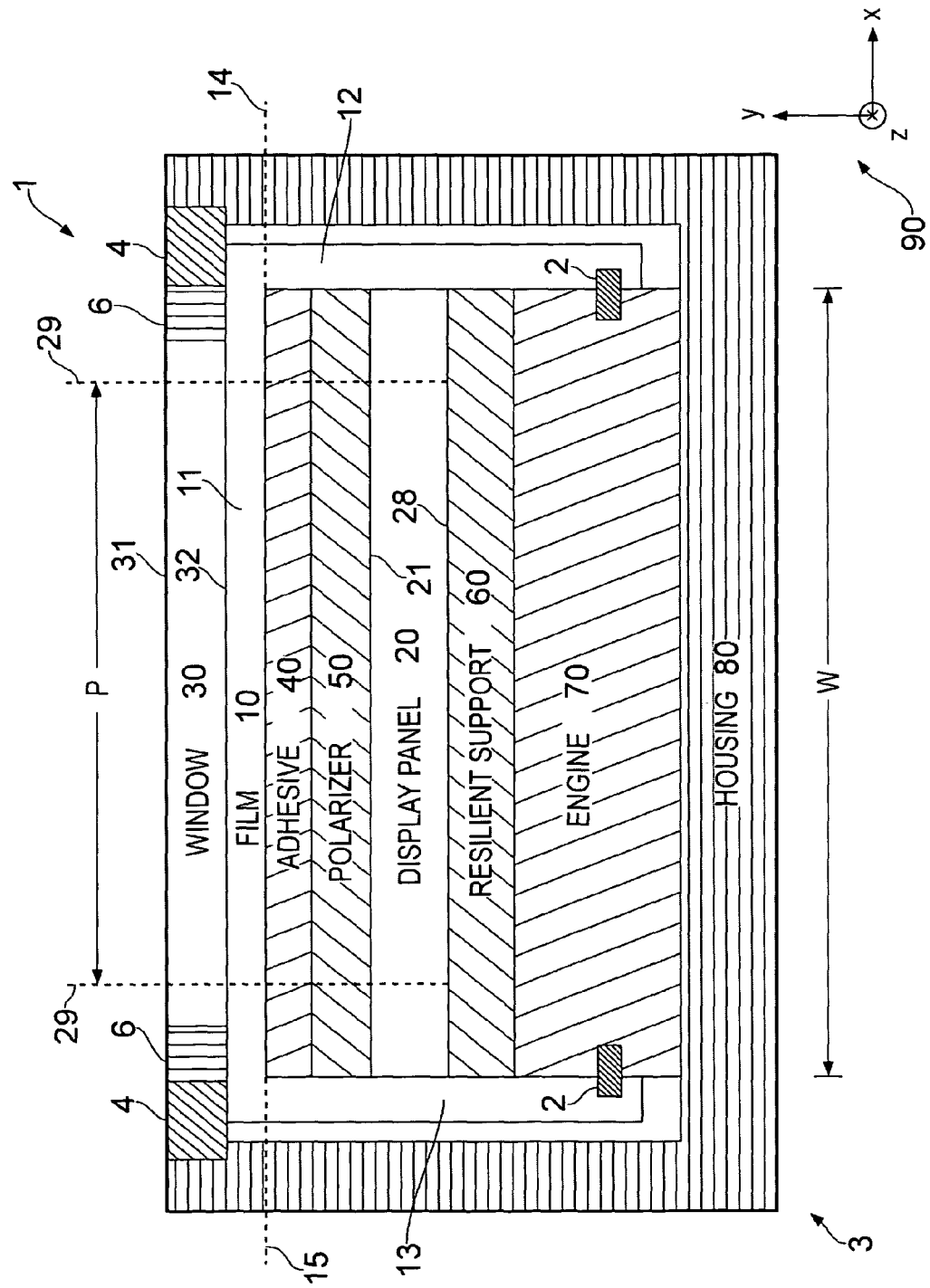
FIG. 5 illustrates a second schematic of a cross section of the apparatus in which the display panel is, for example, an OLED display panel.

A cross section of an electronic device 3 is illustrated in FIG. 5. The electronic device 3 may be a hand held electronic device such as a tablet computer, a games console or a mobile telephone. The illustrated apparatus/display arrangement 1 forms part of the electronic device 3 and comprises a display window 30, an adhesive 40, a polarizer 50 and a resilient support 60.

The electronic device 3 further comprises an engine 70 and an electronic device housing 80. The engine 70 may, for example, comprise the chassis, a printed writing board and/or more or more chipsets. The housing 80 is the outermost region of the sides and back of the electronic device 3. In the illustrated example, the sides of the electronic device 3 are substantially parallel with the y dimension and the rear of the electronic device 3. An aperture in the electronic device housing 80 is provided in which the display window 30 is placed.

The display window 30 comprises an outer surface 31, for exposure to a user, and an inner surface 32. The outer surface 31 and the inner surface are separated by the depth of the window 30. The reference numeral 6 denotes artwork/paint on the window 30. The reference numeral 4 denotes a gasket between the window 30 and the housing 80.

One side of the first portion 11 of the film 10 is attached, directly or indirectly, to the inner surface 32 of the window 30. In the illustrated example, one side of the first portion 11 of the film 10 is directly attached (for example, adhered) to the inner surface 32 of the window 30. The display window 30 may, for instance, be laminated to the first portion 11 of the film 10. The attachment between the first portion 11 of the film 10 and the inner surface 32 of the window 30 holds the window 30 in place at the front of the electronic device 3.

In the example illustrated in FIG. 5, the opposite side of the first portion 11 of the film 10 to that which is adhered to the window 30 is adhered to a polarizer 50. The polarizer 50 is located on the upper surface 21 of the display panel 20. The display panel 20 in this instance may, for example, be an OLED display panel.

The resilient support 60 is attached to the display panel 20 and located beneath the display panel 20. For example, it may be adhered to the lower surface 28 of the display panel 20. The resilient support 60 may be a Poron® cushion that enables small movement of the display panel 20 in the event that the housing 80 is flexed/bent (for example, when the housing 80 is dropped by a user) in order to mitigate/prevent damage to the display panel 20.

In the illustrated example, the resilient support 60 is attached to (and located on) the engine 70. The second and third portions 12, 13 of the film 10 are fastened to the engine 80. As can be seen from FIG. 5, there are no air gaps between any of the elements 30, 10, 50, 20, 60 and 70 in the display arrangement 1.

The dotted lines denoted with the reference numeral 29 indicate the perimeter of the pixel array of the display panel 20 in the x dimension. The letter 'p' and its accompanying arrows in FIG. 6 indicates the presence of pixels. The area outside the dotted lines 29, towards the artwork 6 and the gasket 4, is the "deadband" of the display panel 20 in which there are no pixels.

Advantageously, the apparatus/display arrangement 1 illustrated in FIG. 5 is compact and only has a narrow border around the display panel 20. This is enabled by the manner in which the film 10 is used to hold the display panel 20 and other items 30, 50, 60 in the display arrangement 1 in place.

Figure 6:
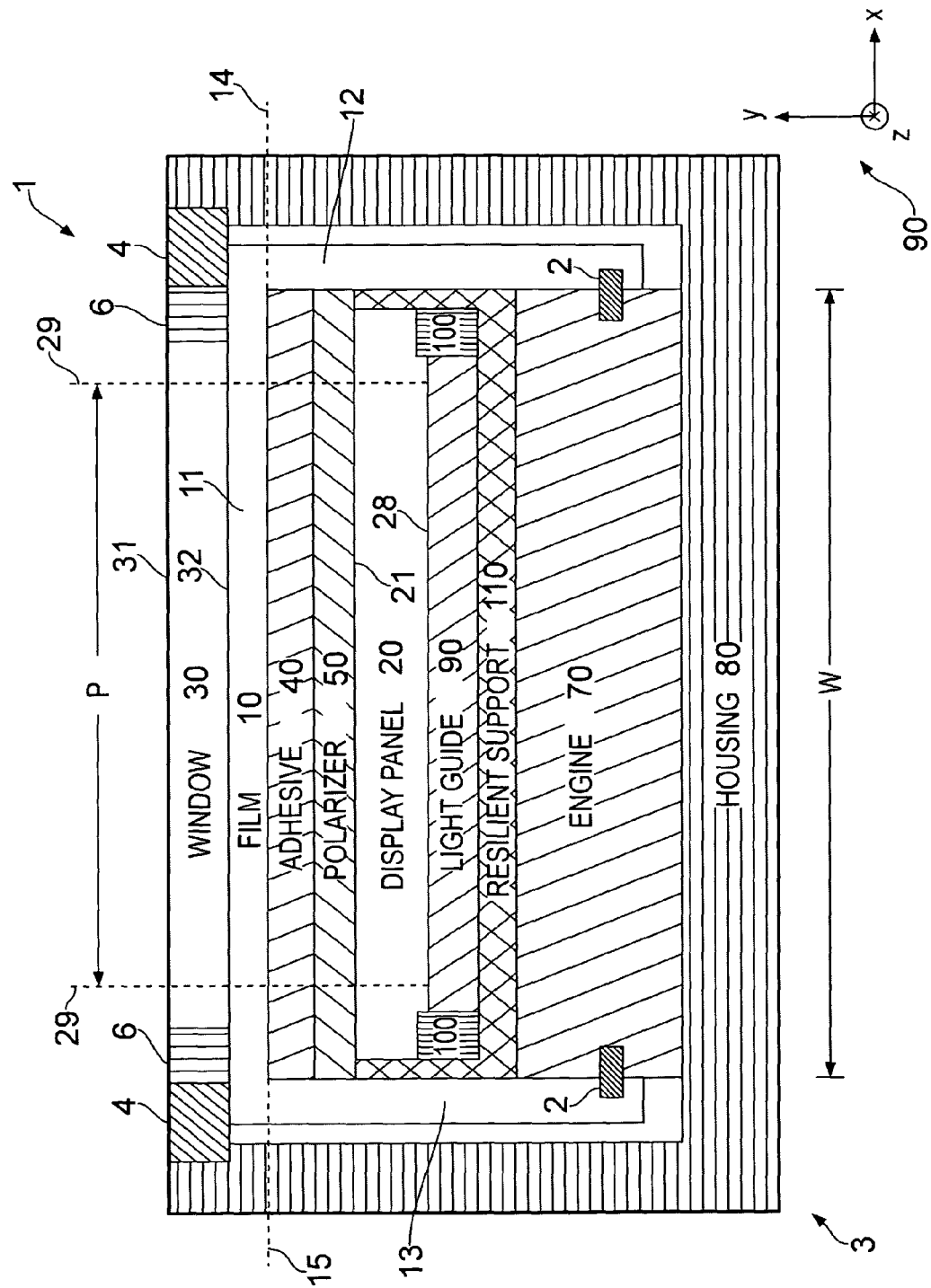
FIG. 6 illustrates a third schematic of a cross section of the apparatus in which the display panel is, for example, an LCD panel.

The embodiment of the invention illustrated in FIG. 6 differs from the embodiment in FIG. 5 in that there is a frame 100, a light guide 90 and a (non-resilient) support 110, and in that there is no resilient support 60. The display panel 20 in the FIG. 6 embodiment may, for example, be an LCD panel.

The light guide 90 is configured to guide light in the +x dimension and to cause some of the guided light to be directed in the +y dimension, thus enabling a viewer to see the pixels in the display panel 20. The support 110 and the frame 100 provide structural support to the display panel 20 and light guide 90. The support 110 may be made from metal and the frame 100 may be made from plastic.

Figure 7:
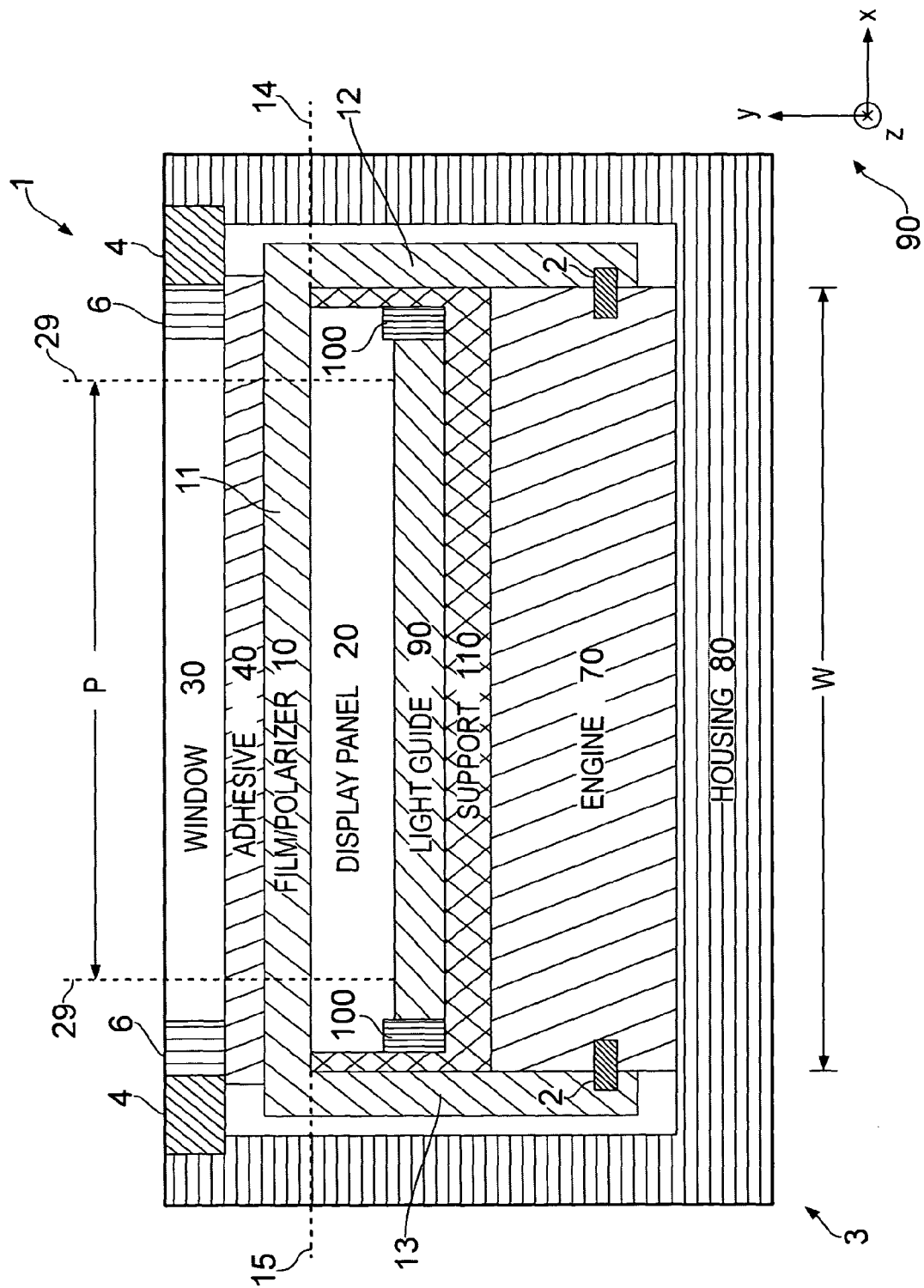
FIG. 7 illustrates a fourth schematic of a cross section of the apparatus in which the film is a polarizer.

The embodiment of the invention illustrated in FIG. 7 differs from that illustrated in FIG. 6 in that the film 10 is a polarizer, and that the separate polarizer 50 has been removed. This has the advantage of making the display arrangement 1 more compact in the y dimension. The polarizer 50 illustrated in FIG. 5 could also be removed by making the film 10 in FIG. 5 a polarizer.

Figure 8:
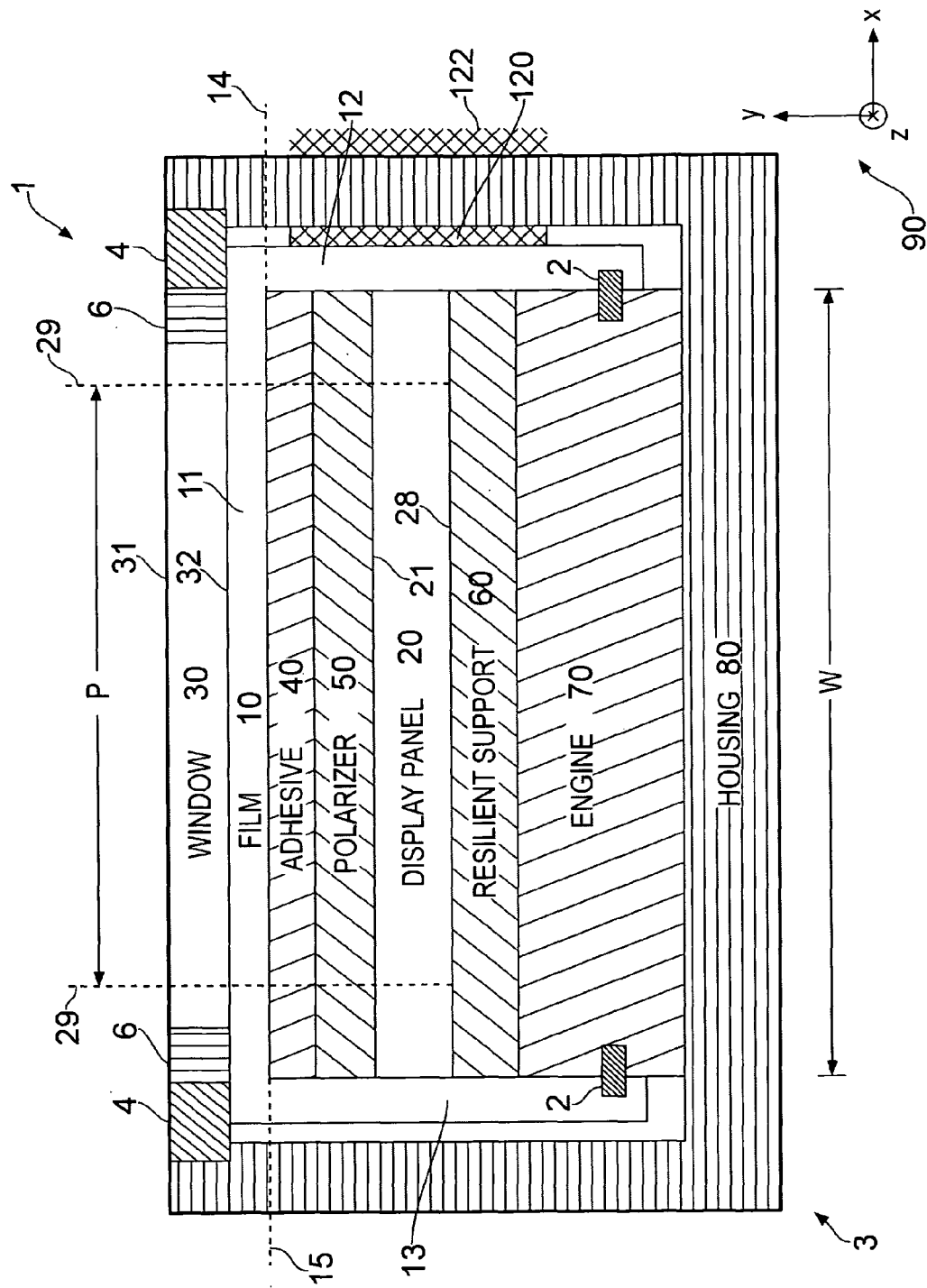
FIG. 8 illustrates a fifth schematic of a cross section of the apparatus in which the film is used to provide a touch sensor at a side of an electronic device housing.

FIG. 8 differs from FIG. 6 in that the second portion 12 of the film 10 is a support or a substrate for a touch sensor 120. The touch sensor 120 is configured to provide a touch sensitive region 122 on or outside the housing 80 that is different (and separated) from the touch sensitive region of the display. In the illustrated example, the touch sensitive region provided by the touch sensor 120 provides a touch sensitive region 122 that is located on the side of the electronic device housing 80, rather than on the front of the electronic device 3 where the window 30 is located.

Figure 9:
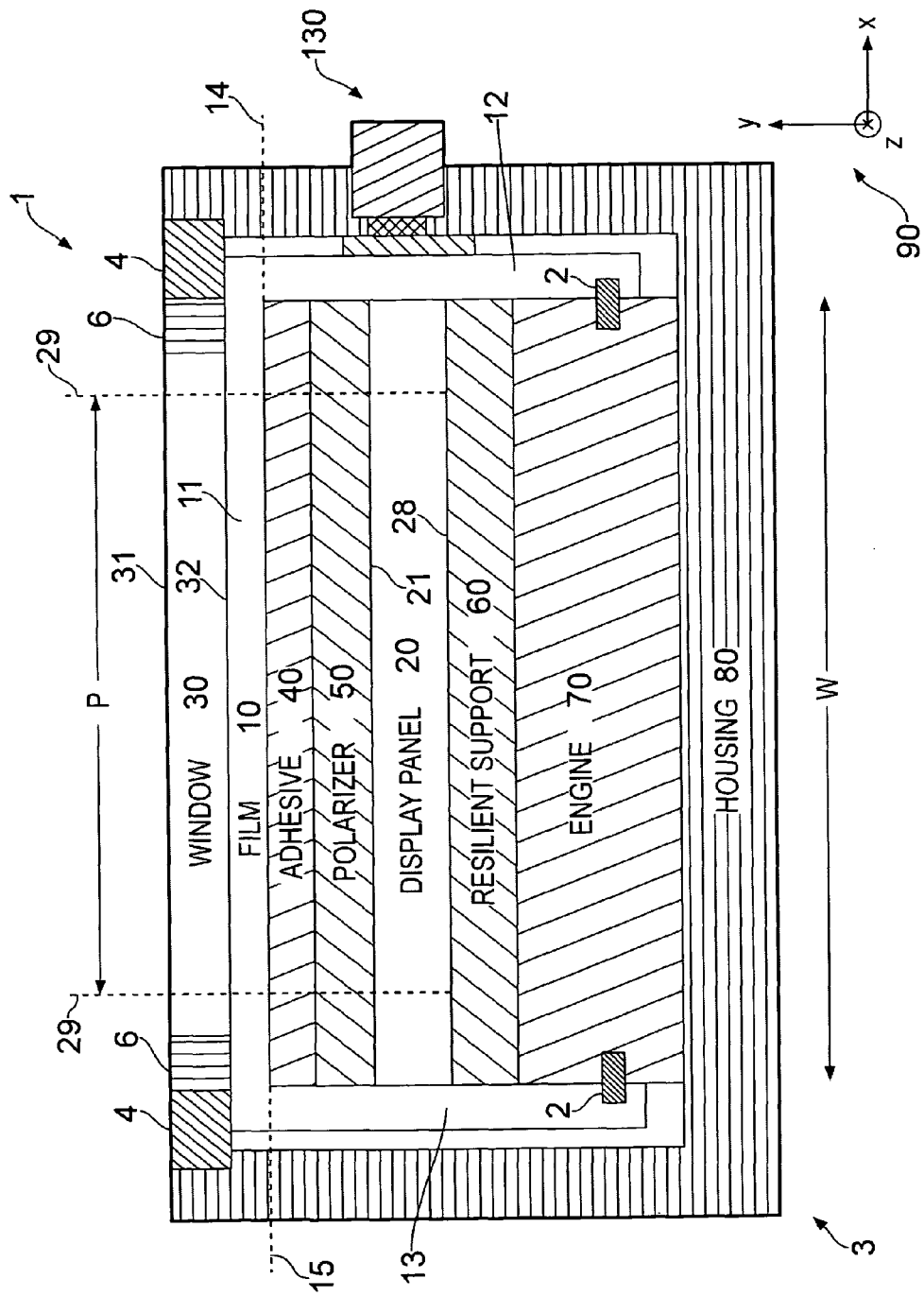
FIG. 9 illustrates a sixth schematic of a cross section of the apparatus in which the film is used to provide a key at a side of an electronic device housing.
Figure 10:
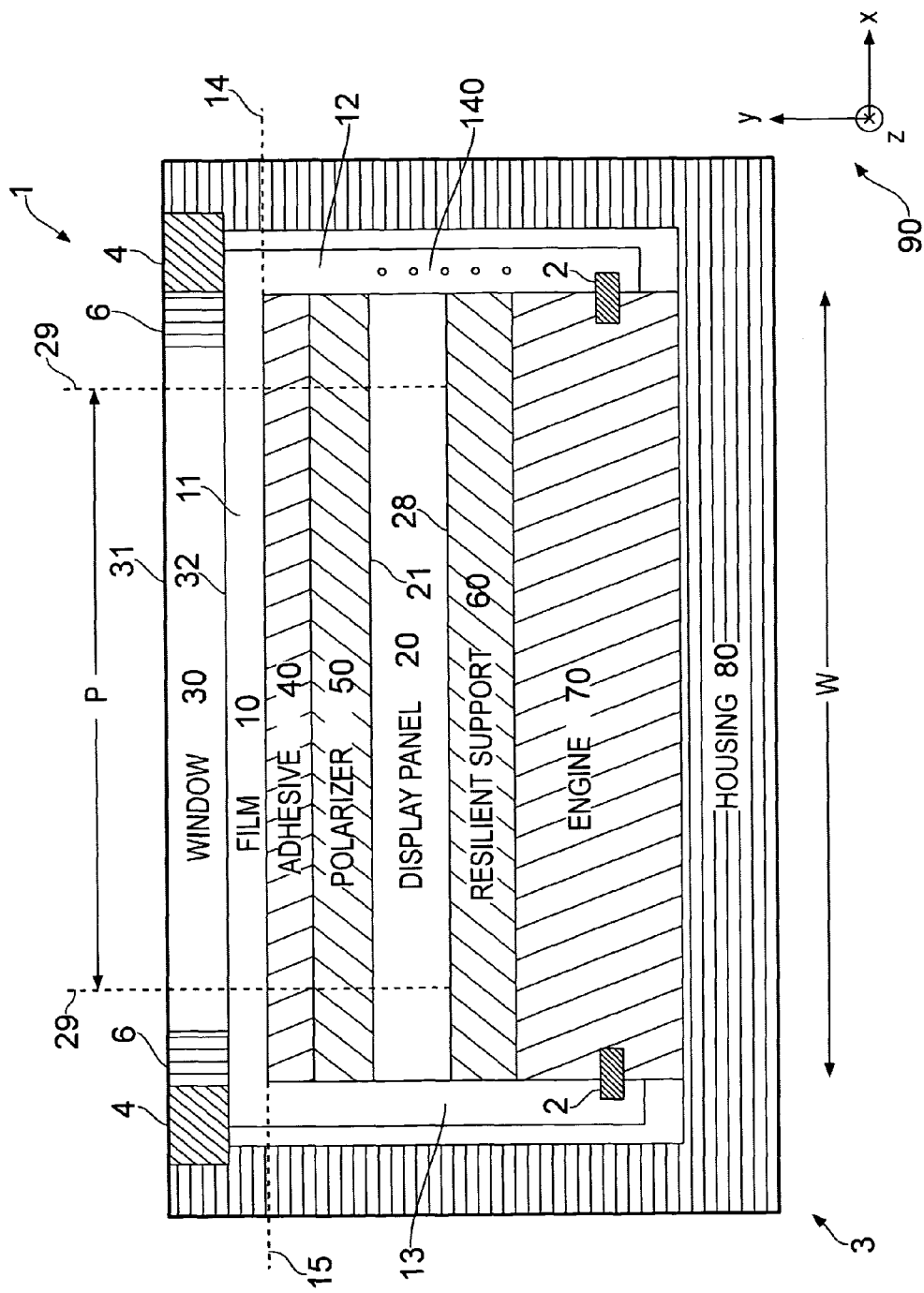
FIG. 10 illustrates a seventh schematic of a cross section of the apparatus in which the film provides a base or a substrate for electrical wiring.

FIG. 9 differs from FIG. 6 in that the second portion 12 of the film 10 provides a support or a substrate for a key 130. FIG. 10 differs from FIG. 6 in that the second portion 12 of the film 10 provides a support or a substrate for electric wiring 140. In the FIGS. 8, 9 and 10 embodiments, the connection between the second portion 12 of the film 10 and the engine 70 that holds the film 10 in place may be an electrical connection.

It will be clear to those skilled in the art that FIGS. 1 to 3 and 5 to 10 are intended to be illustrative schematics. The items illustrated in each figure are not shown to scale.

The blocks illustrated in FIG. 4 may represent steps in a method. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, in some embodiments of the invention, the display panel 20 may have curved sides 24, 25. In these embodiments the second and third portions 12, 13 of film 10 may be curved when the display panel 20 is being held in place by the film 10.

Although a single polarizing layer is shown in the examples illustrated in FIGS. 5 to 10, additional polarizing layers may be present between the film 10 and the display panel 20 in practice.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus, comprising:
   a display panel having a length, a width and a depth; and
   a film comprising a first portion, extending along a surface of the display panel defined by the length and the width, and a second portion, extending at least partially along the depth and in contact with the display panel and coupled, with a fastener, to a component fastened to an electronic device housing.

2. An apparatus as claimed in claim 1, wherein tension in the film holds the display panel in place in the electronic device housing.

3. An apparatus as claimed in claim 1, wherein at least the first portion of the film is substantially transparent.

4. An apparatus as claimed in claim 1, wherein each of the length and the width of the display panel is greater than the depth of the display panel.

5. An apparatus as claimed in claim 1, wherein the second portion of the film extends along the whole of the depth of the display panel.

6. An apparatus as claimed in claim 1, wherein the film comprises a third portion, extending at least partially along the depth of the display panel on an opposite side of the display panel to the second portion.

7. An apparatus as claimed in claim 1, wherein the display panel comprises an array of pixels, and the film covers all of the pixels in the display panel.

8. An apparatus as claimed in claim 1, wherein the first portion of the film is attached, directly or indirectly, to the surface of the display panel.

9. An apparatus as claimed in claim 8, wherein the first portion of the film is attached using an adhesive.

10. An apparatus as claimed in claim 8, wherein the first portion is indirectly attached to the surface of the display panel via one or more polarizers.

11. An apparatus as claimed in claim 1, wherein the display arrangement further comprises a display window, and the first portion of the film is attached, directly or indirectly, to a lower surface of the display window.

12. An apparatus as claimed in claim 1, wherein the second portion of the film is substantially perpendicular to the first portion of the film.

13. An apparatus as claimed in claim 1, wherein the film is a substrate for a touch sensitive layer.

14. An apparatus as claimed in claim 1, wherein the second portion of the film is a support or a substrate for at least one touch sensor or at least one key.

15. An apparatus as claimed in claim 1, wherein the second portion of the film is a support or a substrate for electrical wiring.

16. An apparatus as claimed in claim 1, wherein the film is a polarizer.

17. A method, comprising:
   causing a first portion of a film to extend along a surface of a display panel, the surface being defined by a length and a width of the display panel; and coupling a second portion of the film, extending at least partially along a depth of the display panel and in contact with the display panel, with a fastener, to a component fastened to an electronic device housing.

18. A method as claimed in claim 17, wherein tension in the film holds the display panel in place within the electronic device housing.

19. An apparatus, comprising:

a display panel comprising an array of pixels that, when the display panel is operational, are visible through a surface of the display panel; and a film that extends along the surface of the display panel and at least partially along a depth of the display panel and in contact with the display panel and coupled, with a fastener, to a component fastened to an electronic device housing, wherein tension in the film at least partially holds the display panel in position in the electronic device housing.

* * * * *